Patented Aug. 22, 1939

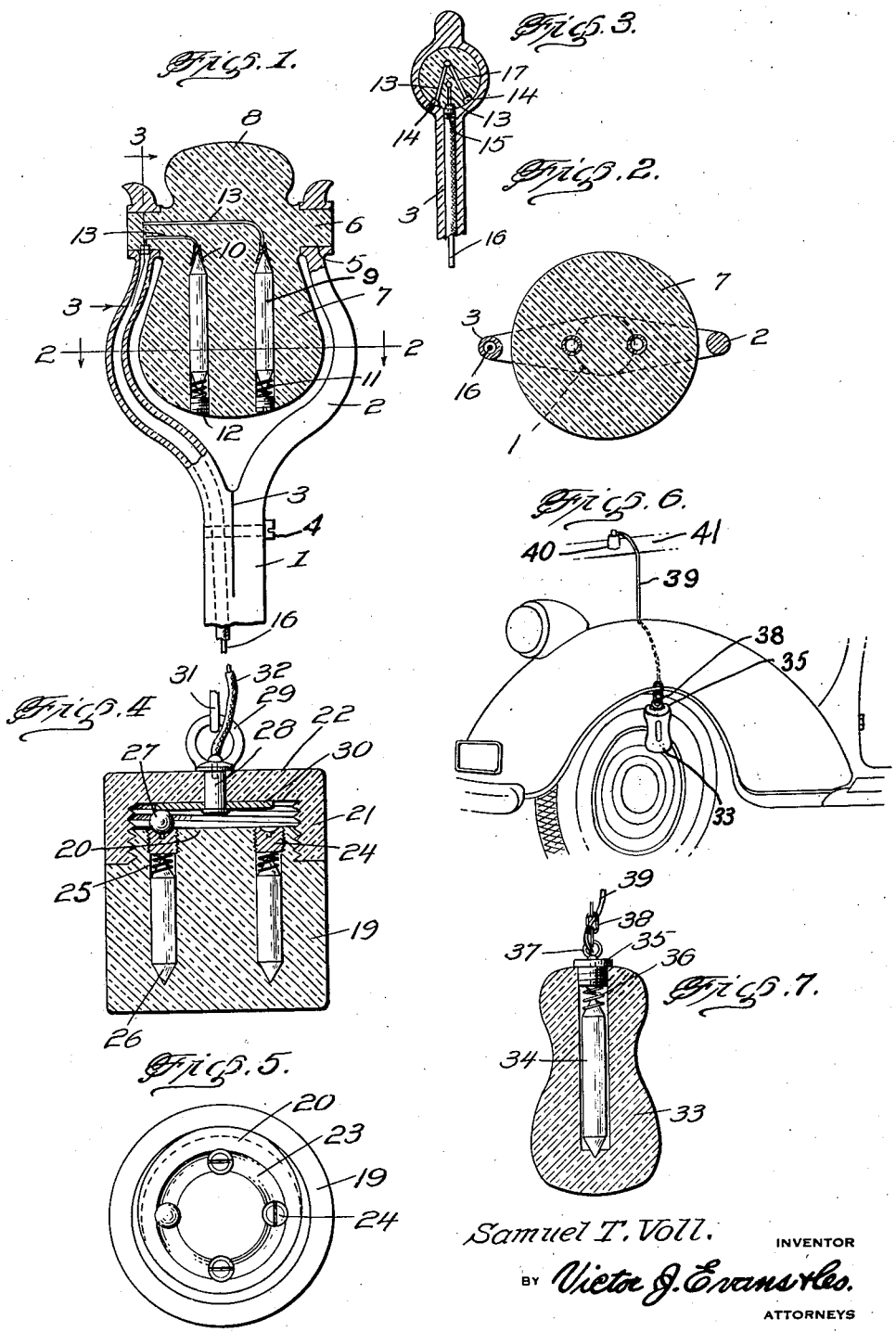

2,170,600

UNITED STATES PATENT OFFICE 2,170,600

SAFETY CLEARANCE LAMP

Samuel T. Voll, Great Falls, Mont.

Application August 16, 1938, Serial No. 225,239

3 Claims. (Cl. 240—8.1)

This invention relates to safety clearance lamps for motor vehicles, and its general object is to provide a lamp of that character which not only can be used as such as well as for other purposes, such as a tail light, fender guide, et cetera, but also in the capacity as a spark plug tester, in that the illuminating elements thereof are in the form of tubes having a gaseous medium therein of high electrical conductivity, such as neon or helium so that the passage of a high tension current therethrough results in illumination thereof.

A further object is to provide a vehicle lamp that is attractive and ornamental, due to the fact that a number of tubes may be employed in the lamp, each having a different gas therein to produce a different colored light that flashes in an intermittent manner, due to the connection of the tubes with spark plugs or other means in the high tension circuit of the ignition system of the vehicle, and the lamp is also mounted for swinging movement, so that it will rock in accordance with the rocking movement of the vehicle, as the latter travels over uneven road surfaces.

Another object is to provide a vehicle lamp that is simple in construction, inexpensive to manufacture, easy to apply to a vehicle or the like, and is efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a view of one form of my lamp, with parts in section.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Figure 4 is a vertical sectional view taken through a modified form.

Figure 5 is a top plan view of the form as shown in Figure 4, with the upper portion or cap removed.

Figure 6 is a perspective view illustrating a further modified form applied to the fender of a motor vehicle and in connection with a spark plug of the ignition system.

Figure 7 is a vertical sectional view taken through the form of Figure 6.

Referring to the drawing in detail, it will be noted that the form as illustrated in Figures 1 to 3 inclusive, includes a mounting bracket that is provided with an upright 1 having suitable means on the lower end thereof for attachment to a vehicle, and the upright has a forked upper end with the arms 2 thereof outwardly curved as shown, and the upright at the juncture of the arms therewith is split as at 3 to facilitate the spreading of the arms with respect to each other. However, the split portion is held together by a screw bolt 4.

The upper ends of the arms 2 terminate in bearing openings 5 having rockably mounted therein trunnions 6 formed on and extending from diametrically opposite sides of the upper end of the body 7 of the lamp housing, the latter being made from any suitable transparent or translucent material that is preferably non-breakable, but of course it can be made from glass. The body 7 is outwardly bulged in curved formation from the connection of the trunnions 6 therewith, to follow the curvature of the arms 2, and the lower portion of the body is substantially of semi-spherical formation while mounted on the upper end of the body is a knob like portion 8. It will be noted that the upper ends of the arms 2 extend outwardly in pointed formation, and that feature coupled with the shape of the lamp housing 7 adds materially to the ornamentality of the lamp, as will be apparent. The lamp housing is preferably solid as shown, and has bores extending vertically therein from the lower end thereof, there being two bores as best shown in Figure 2, but any number may be employed, it depending upon the number of illuminating tubes to be used. Mounted in the bores are the tubes 9 which as shown have conical ends and are held therein with their upper ends in contact with metal caps 10, by coil spring 11 and plug screws 12, the latter being threaded in the lower ends of the bores with the coil spring disposed between the same and the tubes, as clearly shown in Figure 1. By that construction, it will be obvious that the tubes are readily removable, and it will be obvious that the tubes have a gaseous medium therein capable of producing light when subjected to a high tension current. Each tube may have a different type of gas therein, so that a different color will be produced by each tube.

The metal caps 10 act as electrical contact members and connected thereto are one of the ends of conductors 13 which extend through the body and one of the trunnions and have contact members 14 fixed to the opposite ends thereof for engagement with a contact member 15 mounted in the bearing opening in the path of the contact members 14, the contact member 15 being secured to one end of a conductor 16, for connection with a spark plug of the ignition system of a motor vehicle, or other means in the high tension circuit of the system, so as to supply high tension current to the tubes, as will be apparent. One of the conductors 13 preferably has a branch conductor 17 secured thereto, as shown in Figure 3, with the conductor 17 and the end portion of its companion conductor 13 being arranged in diverging relation to bridge the adjacent end portion of the other conductor 13, so that upon rocking movement of the lamp housing, the contact members 14 will have a wiping engagement with the contact member 15 to open and close the circuit to the tubes and thereby result in alternate illumination of the tubes which flash on and off due to the connection of the conductor 16 to a spark plug or the like, as above set forth.

The form as shown in Figures 4 and 5 is of cylindrical formation and includes a solid body 19 having an exteriorly threaded reduced portion 20 at the upper end thereof to provide an annular shoulder for receiving the skirt 21 of a hollow cap 22, the skirt being threaded to the reduced portion as shown, and the skirt is of a height to space the upper wall of the cap from the reduced portion 20.

In this form, the body preferably has four bores opening through the top of the reduced portion and into an annular groove 23 arranged therein. The upper ends of the bores are screw threaded to receive plug screws 24 that cooperate with coil springs 25 for holding the tubes 26 within the bores, as shown, and the plug screws have curved recesses in the upper ends thereof for disposal flush with the annular groove 23 for the latter to provide a race-way for a metallic ball 27 that acts as a conducting means.

Swivelly mounted in the cap 22 is the shank 28 of an eyed member 29, the shank extending through the cap and has fixed to the inner end thereof a contact disk plate 30 having the ball 27 in wiping engagement therewith. The eyed member 29 has connected thereto a flexible element, such as a chain 31 and woven through the chain is a conductor 32 that has one end preferably embedded in and fixed to the shank 28 of the eyed member, while the opposite end is to be connected to a spark plug or other device in the high tension circuit of the vehicle, to supply current to the tubes which of course have a gaseous medium therein.

The chain is adapted to be connected to the vehicle at any appropriate place, with the lamp housing depending therefrom for swinging movement, so as to swing in accordance with the rocking movement of the vehicle. Such swinging movement will cause the ball 27 to travel in the race-way, and thereby open and close the circuit to the respective tubes.

In the form as shown in Figures 6 and 7, it will be noted that the solid body 33 is of elongated formation and is substantially in the shape of a spool, in that it is reduced between its ends, and like the body 19 is formed from any suitable transparent or translucent material. The body 33 also has a bore extending longitudinally therein from its upper end and which has a tube 34 mounted therein, as well as held accordingly by a screw plug 35, with a spring 36 between the plug 35 and the conical upper end of the tube. The screw plug 35 has an eyed member 37 secured thereto, to which is connected one end of a chain 38 for suspending the body 33 from an appropriate portion of a vehicle, such as the fender as shown in Figure 6. Connected to the screw plug 35 and woven through the links of the chain 38 is a conductor 39 that is likewise electrically connected in the high tension circuit of the ignition system and is shown in Figure 6 as being connected to a spark plug 40 mounted in the engine 41.

While the conductors of either form of my invention shown and above described may be fixed to a spark plug or other device in the high tension circuit, the conductors preferably have detachable connection therewith, so that they can be associated with any of the spark plugs, for testing the latter, therefore it will be obvious that my lamp not only acts as such, but also as a spark plug tester.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A motor vehicle lamp comprising a light transmitting solid body having bores extending vertically therein and provided with threaded outer ends, tubes detachably mounted in said bores and having a gaseous medium therein subject to being illuminated by high tension current, plugs threaded in the bores, springs between the tubes and plugs for cooperation with the latter for holding the tubes within the bores, conductor means for electrically connecting the tubes in the high tension circuit of the vehicle, means for mounting the body for swinging movement and adapted for connection to the vehicle, and means for opening and closing the circuit to the tubes and being actuated by the swinging movement of the body.

2. A motor vehicle lamp comprising a light transmitting solid housing including a body having bores therein, tubes mounted in the bores and having a gaseous medium therein subject to being illuminated by high tension current, contact means at one of the ends of the bores to receive the tubes in engagement therewith, means closing the opposite ends of the bores, spring means between the closing means and the tubes for holding the latter in engagement with the contact means, conductor means electrically connected to the contact means and in the high tension circuit of the vehicle, a bracket for attachment to the vehicle, means on said body and rockably mounted in the bracket for swinging movement of the lamp housing, and means in the conductor means to open and close the circuit to the tubes upon swinging movement of the lamp housing.

3. A motor vehicle lamp comprising a light transmitting housing, a solid body included in the housing and having bores therein opening through the upper ends thereof, said body having an annular groove in the upper end thereof with the bores opening into the groove, tubes mounted in the bores and having a gaseous medium therein subject to being illuminated by high tension current, plugs closing the upper ends of the bores and having recesses therein flush with the groove to provide therewith a race-way, springs between the tubes and plugs and cooperating with the latter for holding the tubes within the bores and providing conductor means for said tubes, a closure cap for the upper end of the body and providing a space between the cap and body, a conductor ball mounted in the raceway for engagement with the plugs, a contact member secured to the cap for wiping engagement by the ball, hanger means for suspending the lamp housing from the vehicle for swinging movement and including means electrically connected to the contact member, and means for electrically connecting the contact connecting means in the high tension circuit of the vehicle.

SAMUEL T. VOLL.